(12) United States Patent
Li et al.

(10) Patent No.: US 7,702,622 B2
(45) Date of Patent: Apr. 20, 2010

(54) ADVANCED TECHNIQUES FOR SQL GENERATION OF PERFORMANCEPOINT BUSINESS RULES

(75) Inventors: Baomin Li, Renton, WA (US); George Yan, Bellevue, WA (US); Mark Yang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 11/771,523

(22) Filed: Jun. 29, 2007

(65) Prior Publication Data

US 2009/0006370 A1    Jan. 1, 2009

(51) Int. Cl.
*G06F 7/00* (2006.01)
*G06F 17/00* (2006.01)

(52) U.S. Cl. .................. 707/3; 707/4; 707/5; 707/6; 707/100

(58) Field of Classification Search ............... 707/3–5
See application file for complete search history.

(56) References Cited

U.S. PATENT DOCUMENTS

| | | | |
|---|---|---|---|
| 5,548,754 | A | 8/1996 | Pirahesh et al. |
| 5,590,324 | A | 12/1996 | Leung et al. |
| 5,713,020 | A | 1/1998 | Reiter et al. |
| 5,765,159 | A * | 6/1998 | Srinivasan ............... 707/102 |
| 6,170,009 | B1 * | 1/2001 | Mandal et al. ............ 709/223 |
| 6,192,357 | B1 | 2/2001 | Krychniak |
| 6,442,543 | B1 | 8/2002 | Snodgrass et al. |
| 6,578,028 | B2 | 6/2003 | Egilsson et al. |
| 6,629,094 | B1 * | 9/2003 | Colby et al. ............... 707/4 |
| 7,047,249 | B1 | 5/2006 | Vincent |
| 7,149,731 | B2 | 12/2006 | Dettinger et al. |
| 7,320,001 | B1 * | 1/2008 | Chen ........................ 707/100 |
| 7,542,990 | B2 * | 6/2009 | Paval ....................... 707/103 R |
| 2004/0139061 | A1 * | 7/2004 | Colossi et al. ............ 707/3 |
| 2005/0192922 | A1 * | 9/2005 | Edlund et al. ............ 707/1 |
| 2005/0204340 | A1 | 9/2005 | Ruminer et al. |
| 2005/0210004 | A1 | 9/2005 | Focazio et al. |
| 2006/0010058 | A1 * | 1/2006 | D'Hers et al. ............ 705/35 |
| 2006/0235837 | A1 * | 10/2006 | Chong et al. ............. 707/4 |
| 2007/0027904 | A1 * | 2/2007 | Chow et al. .............. 707/102 |
| 2007/0078826 | A1 * | 4/2007 | Bozkaya et al. .......... 707/3 |

(Continued)

OTHER PUBLICATIONS

Generate SQL queries based on DB2 Cube Views metadata http://www-128.ibm.com/developerworks/db2/library/techarticle/dm-0601dere/, pp. 1-18.

(Continued)

*Primary Examiner*—Etienne P LeRoux
*Assistant Examiner*—Jessica N Le
(74) *Attorney, Agent, or Firm*—Merchant & Gould, P.C.

(57) ABSTRACT

Computer-implemented methods and computer-readable storage media are disclosed to facilitate the application of business rules. A rule is received, the rule defining one or more calculations to be performed on specified data stored in a multidimensional database to yield at least one result. At least one database query is generated seeking the specified data to be retrieved from the multidimensional database. An intermediary table is created to accommodate the specified data retrieved from the multidimensional database. The specified data is stored in the intermediary table and the specified data is manipulated when the data is retrieved or after the specified data is stored in the intermediary table.

20 Claims, 10 Drawing Sheets

U.S. PATENT DOCUMENTS

| | | | |
|---|---|---|---|
| 2007/0136388 A1* | 6/2007 | Voss et al. | 707/200 |
| 2007/0208721 A1* | 9/2007 | Zaman et al. | 707/4 |
| 2008/0208822 A1* | 8/2008 | Bozkaya et al. | 707/3 |
| 2008/0270456 A1* | 10/2008 | O'Halloran et al. | 707/102 |
| 2009/0006301 A1* | 1/2009 | Goetsch et al. | 706/47 |
| 2009/0006349 A1* | 1/2009 | Fuxman et al. | 707/4 |

OTHER PUBLICATIONS

BizTalk Server Business Rules Framework http://www.microsoft.com/technet/prodtechnol/biztalk/biztalk2004/planning/business-rules-framework-overview.mspx, pp. 1-7.

SQL—Stored Procedures, Views, and Dynamic SQL Generation http://www.advogato.org/article/894.html, pp. 1-11.

* cited by examiner dimtime 790

| Year | Quarter | Month |
|---|---|---|
| 2005 | 20051 | 200501 |
| 2005 | 20051 | 200502 |
| 2005 | 20051 | 200503 |
| 2005 | 20052 | 200504 |
| 2005 | 20052 | 200505 |
| 2005 | 20052 | 200506 |
| 2005 | 20053 | 200507 |
| 2005 | 20053 | 200508 |
| 2005 | 20053 | 200509 |

FIGURE 7 factable 890

| Row ID | Month ID | Scenario ID | Product ID | Value |
|---|---|---|---|---|
| 1 | 1 | 200503 | 1 | 210 | 100 |
| 2 | 2 | 200504 | 1 | 220 | 200 |
| 3 | 3 | 200505 | 1 | 220 | 300 |
| 4 | 4 | 200506 | 1 | 220 | 400 |
| 5 | 5 | 200507 | 1 | 220 | 500 |
| 6 | 6 | 200508 | 1 | 220 | 600 |
| 7 | 7 | 200509 | 1 | 230 | 700 |

FIGURE 8

900 atable — 990

| Row ID | Year ID | Product ID | Value |
|---|---|---|---|
| 1 | 1 | 2004 | 210 | 1.1 |
| 2 | 2 | 2004 | 220 | 1.2 |
| 3 | 3 | 2004 | 230 | 1.3 |
| 4 | 4 | 2005 | 210 | 1.2 |
| 5 | 5 | 2005 | 220 | 1.4 |
| 6 | 6 | 2005 | 230 | 1.5 |
| 7 | 7 | 2006 | 210 | 1.2 |
| 8 | 8 | 2006 | 220 | 1.3 |
| 9 | 9 | 2006 | 230 | 1.4 |

FIGURE 9

1000 temptable1 — 1090

| Month ID | Scenario ID | Product ID | S_Month ID | S_Scenario ID | Value |
|---|---|---|---|---|---|
| 200509 | 2 | 220 | 200504 | 1 | 200 |
| 200509 | 2 | 220 | 200505 | 1 | 300 |
| 200509 | 2 | 220 | 200506 | 1 | 400 |

FIGURE 10 temptable2 — 1190

| Month ID | Scenario ID | Product ID | v1 | v2 | Value |
|---|---|---|---|---|---|
| 200509 | 2 | 220 | 300 | NULL | NULL |

FIGURE 11 temptable2 — 1190

| Month ID | Scenario ID | Product ID | v1 | v2 | Value |
|---|---|---|---|---|---|
| 200509 | 2 | 220 | 300 | 1.4 | 420 |

FIGURE 12 factable

| | Row ID | Month ID | Scenario ID | Product ID | Value |
|---|---|---|---|---|---|
| 1 | 1 | 200503 | 1 | 210 | 100 |
| 2 | 2 | 200504 | 1 | 220 | 200 |
| 3 | 3 | 200505 | 1 | 220 | 300 |
| 4 | 4 | 200506 | 1 | 220 | 400 |
| 5 | 5 | 200507 | 1 | 220 | 500 |
| 6 | 6 | 200508 | 1 | 220 | 600 |
| 7 | 7 | 200509 | 1 | 230 | 700 |
| 8 | 8 | 200509 | 2 | 220 | 420 |

FIGURE 13

ADVANCED TECHNIQUES FOR SQL GENERATION OF PERFORMANCEPOINT BUSINESS RULES

BACKGROUND

Database management systems have evolved greatly over the past several years. Database managers once included only hierarchical systems which were satisfactory for information storage and retrieval. Later, relational database managers were developed to maintain data in a tabular form that provided improved flexibility in querying and analyzing data based on selected attributes presented in the rows and columns of the relational tables. More recently, multidimensional data models have provided still greater flexibility in querying and analyzing data stored for the members in any of the dimensions of the multidimensional data models. Multidimensional data models support contemporary forms of business intelligence applications, such as on-line analytical processing (OLAP). Accordingly, multidimensional databases are commonly termed "OLAP cubes."

Analogous to the way in which relational databases are queried using structured query language (SQL) systems, multidimensional data models may be queried using multidimensional expression (MDX) systems. For example, the Microsoft Office PerformancePoint Server 2007 product produced by Microsoft Corporation of Redmond, Wash., allows multidimensional data model to be accessed using MDX queries or MDX scripts in order to give effect to business rules to be applied to the data.

MDX expressions offer tremendous flexibility and, thus, are very powerful business intelligence tools. Nonetheless, MDX expressions may not provide a desirable level of performance when the target size of the expressions becomes very large. For example, performing aggregation functions that calculate sums, averages, or other calculations over a large, multidimensional data structure using MDX queries or MDX scripts may involve performing many calculations over a vast multidimensional cell space. In such cases, the performance resulting from the use of MDX queries or MDX scripts may prove unsatisfactory.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to computer-implemented methods and computer-readable media for structured query language (SQL) generation of business rules. Applying a business rule to a multidimensional database using multidimensional query tools may prove inefficient. Instead, business rules can be applied to the database using SQL queries and commands to retrieve relevant data from the multidimensional database and manipulate the data.

More specifically, computer-implemented methods and computer-readable storage media are disclosed to facilitate the application of business rules. A rule is received, the rule defining one or more calculations to be performed on specified data stored in a multidimensional database to yield at least one result. At least one database query is generated seeking the specified data to be retrieved from the multidimensional database. An intermediary table is created to accommodate the specified data retrieved from the multidimensional database. The specified data is stored in the intermediary table and the specified data is manipulated when the data is retrieved or after the specified data is stored in the intermediary table.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. The first digit in three-digit reference numerals refers to the figure in which the referenced element first appears.

FIG. 7 is a time dimension table used to correlate the leveled hierarchies in a time dimension;

FIG. 8 is an original fact table used in illustrating an example of an implementation of business rules generation;

FIG. 9 is an assumption model or table used in illustrating an example of an implementation of business rules generation;

FIG. 10 is a first intermediary table used by implementations of business rules generation to receive and manipulate data;

FIG. 11 is a second intermediary table indicating partial population of the intermediary table of FIG. 11;

FIG. 12 is the second intermediary table of FIG. 11 once the intermediary table has been populated with the specified data and indicated calculations are performed;

FIG. 13 is an updated fact table relative updating the original fact table of FIG. 8 updated to include the result generated by application of the business rule;

DETAILED DESCRIPTION OF IMPLEMENTATIONS

This detailed description describes implementations of structured query language (SQL) generation of business rules to efficiently apply the rules to a multidimensional database. As previously described, application of business rules presented in multidimensional expression (MDX) queries and MDX script may degrade significantly as the scope and size of the database increases. However, manifesting the same rules in SQL can result in more efficient application of the rules. Inherent technical difficulties, for example, in implementing aggregation functions or supporting global assumptions models presented at different levels of granularity, are addressed by using sub-queries to retrieve data needed to implement the business rules, by using join operations with dimension tables to resolve differences in granularity, and by setting appropriate defaults to be used when dimensions are not clearly specified.

Benefits of SQL Generation of Business Rules

As previously mentioned, presenting and applying business rules implemented as an MDX query or an MDX script can be inefficient when the business rule is to be applied to a large, multidimensional cell space. These problems are increased when data relevant to the business rule includes data stored in fact tables or assumptions models that are presented at a different level of granularity as other data relevant to the business rules.

Figure 1:
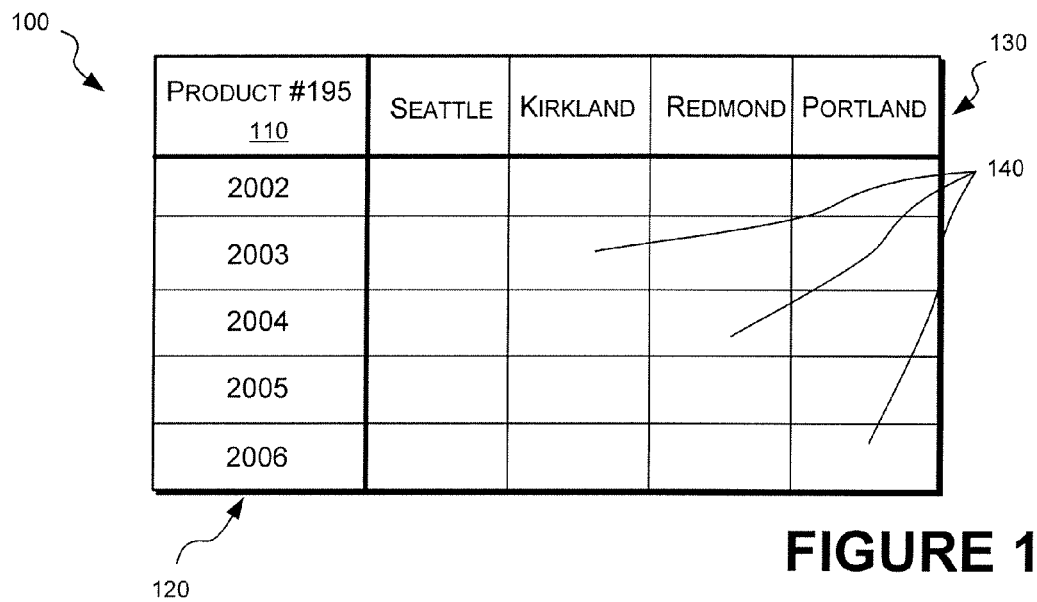
FIG. 1 is a block diagram of a table representing a simplified database for storing data to be used in applying an exemplary business rule.

By way of illustration, FIG. 1 shows a relatively simple, two-dimensional data table 100 for storing sales data for "Product #195" 110, one of a plurality of products sold by a hypothetical business. Using the table 100, the business tracks the results over on an annual basis over a range of years 120. The exemplary range of years 120 includes the years 2002, 2003, 2004, 2005, and 2006. The results are also tracked, along another axis of the table, for each of a range of locations 130. The exemplary range of locations 130 includes the communities Seattle, Kirkland, and Redmond in the State of Washington, and Portland, Oreg. Although specific data values are not shown in the cells in the table, the values, for example, may represent the gross, dollar-value sales for Product #195 110 for each year in the range of years 120 for each location in the range of locations 130.

Using the table 100, it would be a relatively simple matter, for example, if a user wanted to forecast the sales results for the year 2007 for Product #195 110 for each of the locations 130 as being 110% of the average of the past five year's sales. The average results for each product of the last five years could be averaged for each of the locations 130. Then, to arrive at the projected sales for 2007, a multiplier of 1.1 (not shown in FIG. 1) is applied to each of the average values to represent the forecasted sales of Product #195 110 for each of the locations 130.

However, upon adding dimensions to the database, application of the business rule could become more burdensome. For example, another business rule might seek to forecast the total average sales for each location as 110% of the average sales of the previous five years, but this time for each of several different products. This data may be stored in a multidimensional data structure. The cell space involved in making those calculations expands with each of the products. If there are many different products, the cell space could be vast, and the resulting number of calculations could be huge.

Figure 2:
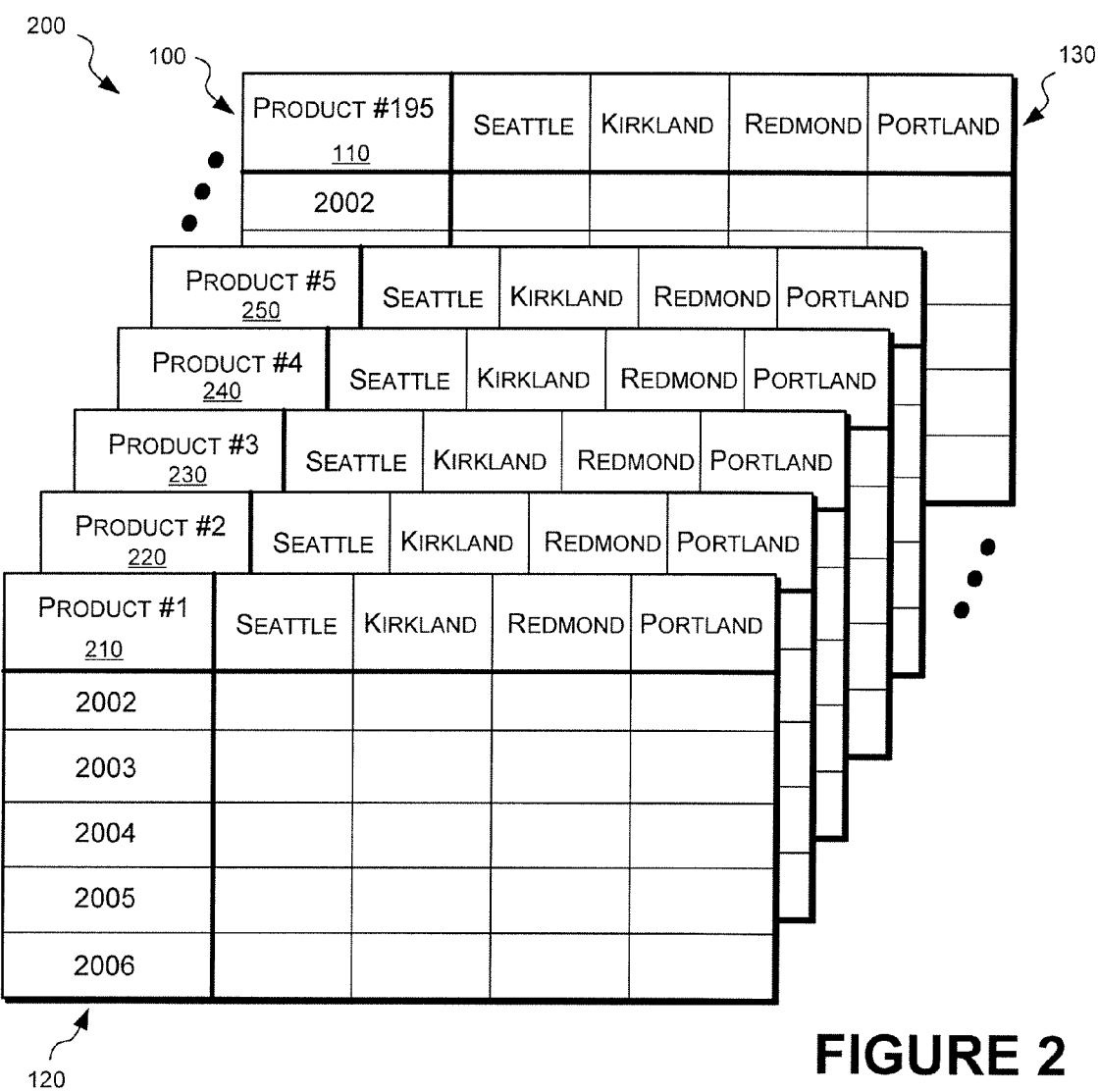
FIG. 2 is a block diagram of a multidimensional database represented as a plurality of related data tables.

FIG. 2 illustrates a multidimensional database visually represented as a series of tables 200. The tables 200 represent a three-dimensional database storing the sales data for each of the years 120, for each location 130, and for each of a number of products 110 and 210-250. In the example of FIG. 2, the table 100 for Product #195 110 is now one of many tables 200. Applying the business rule in this situation, for each of the products 110 and 210-250, the average sales would be computed over the range of the years 120 for each of the locations 130, as previously described with reference to FIG. 1. When this has been done for each of the tables, then the average for each of the locations 130 would be calculated for each of the products. Finally, these averages would be multiplied by 1.1 to determine the 110% total forecasted sales for each location.

Application of this rule is a much more burdensome process. First, the average sales by location for each of the products as described with reference to FIG. 1 would have to be calculated for each of the products 110 and 210-250. Thus, the calculations involved in applying the rule described with reference to FIG. 1 would be repeated for each product. Second, tabulating the average for each of the locations 130 involves averaging the average sales for each of the product 110 and 210-250 for each of the locations 130.

The example of FIG. 1 involves the calculation of an average for the sales data for the five years 120 for each of the four locations 130. By contrast, the example of FIG. 2 first involves calculating the average for the sales data for the five years 120 for each of the four locations 130 for each of the six products 110 and 210-250. Second, the average for each of the six products 110 and 210-250 would be calculated for each of the four locations 130. Thus, as compared with the four averages computed in the example of FIG. 1, the example of FIG. 2 involves taking 28 averages, with four for each of the six products 110 and 210-250 and four more to average the data for all of the products 110 and 210-250. If the number of locations and/or the number of products grows, even if the number of years remains the same, the number of calculations required for the multidimensional space becomes very large. If the seller had locations all across the nation or the world, offered more than six products, and then added dimensions for sizes, colors, or models of each product, making such calculations based on the resulting, vast cell space may become a tremendous computational burden.

Figure 3:
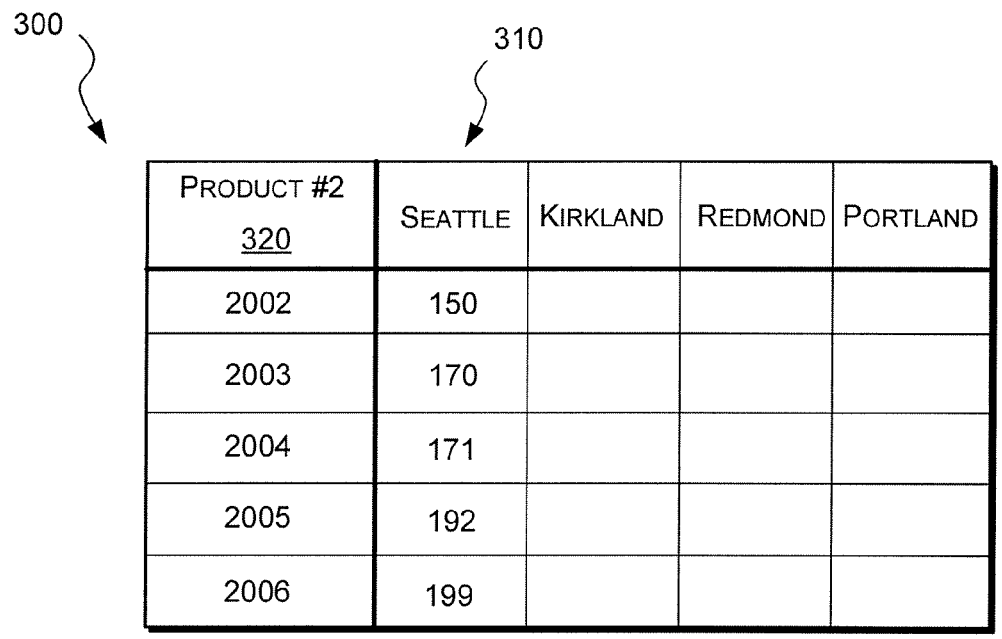
FIGS. 3 and 4 are block diagrams of exemplary data tables to show the potential scarcity of data in dimensions of a multidimensional data structure.
Figure 4:
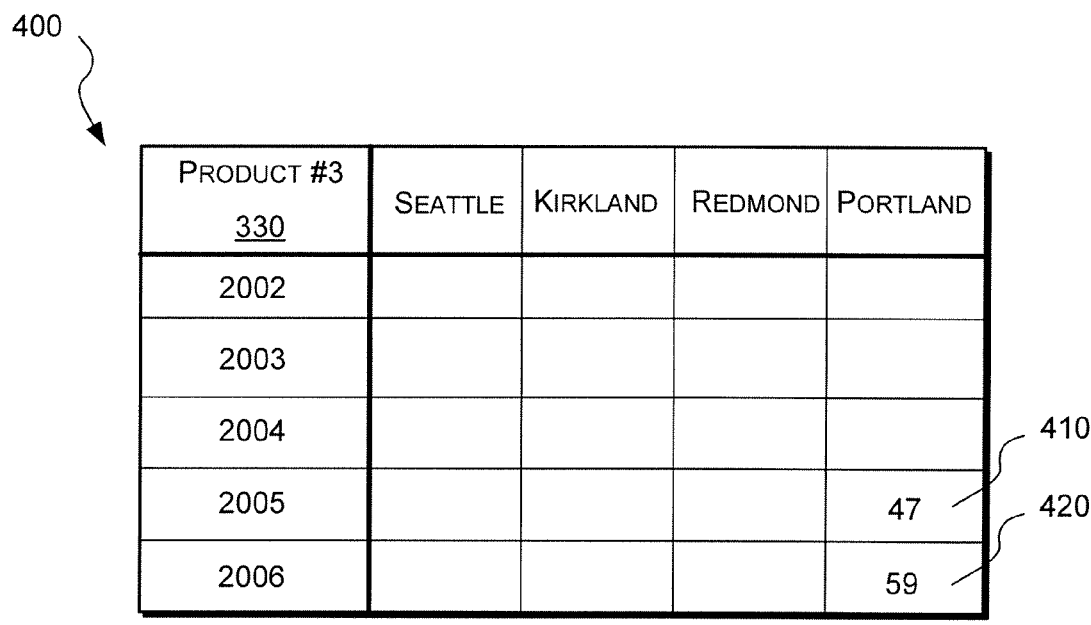

However, making such computations for every permutation of the years 120 and locations 130 for each of the products 110 and 210-250 may prove to be unnecessary. As shown in FIG. 3, the table showing the sales data for Product #2 220 may show that it was sold only in the Seattle location 300 over the range of years 120. Also, as shown in FIG. 4, the table showing the sales data for Product #3 230 may show that Product #4 was only sold in the Portland location, and then only in Year 2005 400 and Year 2006 410. In situations where there is a relative scarcity, it would be wasteful to compute the previously described averages for all locations and all years, when some or most of the cell space may include null data values.

Other problems exist in attempting to apply a business rule over a large cell space. For one example, if data was to be forecast for a new location, no historical data would be available for which to render such a forecast. To describe another example, if the data was tracked quarterly, but the business rule requested a monthly answer, the granularity of the source data and the target data would not match, and the data would have to be translated to provide an appropriate answer.

Translating Business Rules into an Object-Oriented Form

Implementations of the present disclosure of SQL business rules generation recognizes the previously described problems presented in performing calculations and applying business rules in a multidimensional space. One aspect of implementations of the present disclosure that allows for efficient application of business rules is the translation of business rules into an object-oriented form.

As previously described, applying business rules to a multidimensional database such as in an MDX query or an MDX script may involve inefficient and/or unnecessary manipulation of a very large cell space. To avoid this concern, implementations of the present disclosure identify data relevant to the business rule, create one or more intermediary tables to accommodate the data to be used in the application of the business rule, retrieve the relevant data into the intermediary table, and apply the business rule.

The generation of SQL business rules begins with the receipt of the definition of the business rule. Because data relevant to the business rule is retrieved from the database into the business rule table, business rules desirably are defined in a form that lends itself to generation of the queries. In one implementation, the SQL business rules are defined in a format that maps to the objects to be retrieved from the database, describing with specificity the objects to be retrieved from the database.

In the foregoing example of FIGS. 1 and 2, the business rule included forecasting sales results for the year 2007 at 110% of the average of the sales for the previous five years. Thus, for all the products sold at all locations, a user generally may define a business rule as given by Eq. (1):

$$2007 = \text{Average}(2006-2002)*1.1 \qquad (1)$$

The user may want the average for all products and all locations. In order to create a business rule that is more clearly directed to the objects in the database to facilitate the SQL generation of business rules, it is desirable to have the business rule specifically indicate the objects in the database that present the data to which the business rule will be applied.

In one implementation, the user is asked to specifically recite each set of members within a dimension to which the rule will apply or, if the business rule is to apply to a whole dimension, to expressly recite that dimension. Specifically, the user is asked to recite a "SCOPE" of the business rule to describe the members and/or dimensions relevant to the rule, then to specify the rule. The definition of the business rule, which describes the rule itself as "THIS," is provided in Eq. (2):

Scope({2007},
    {Product.Members}.{Geographical.Members})

This=AVG({2006,2005,2004,2003,2002})*1.1

End Scope                                               (2)

Figures 5, 6:
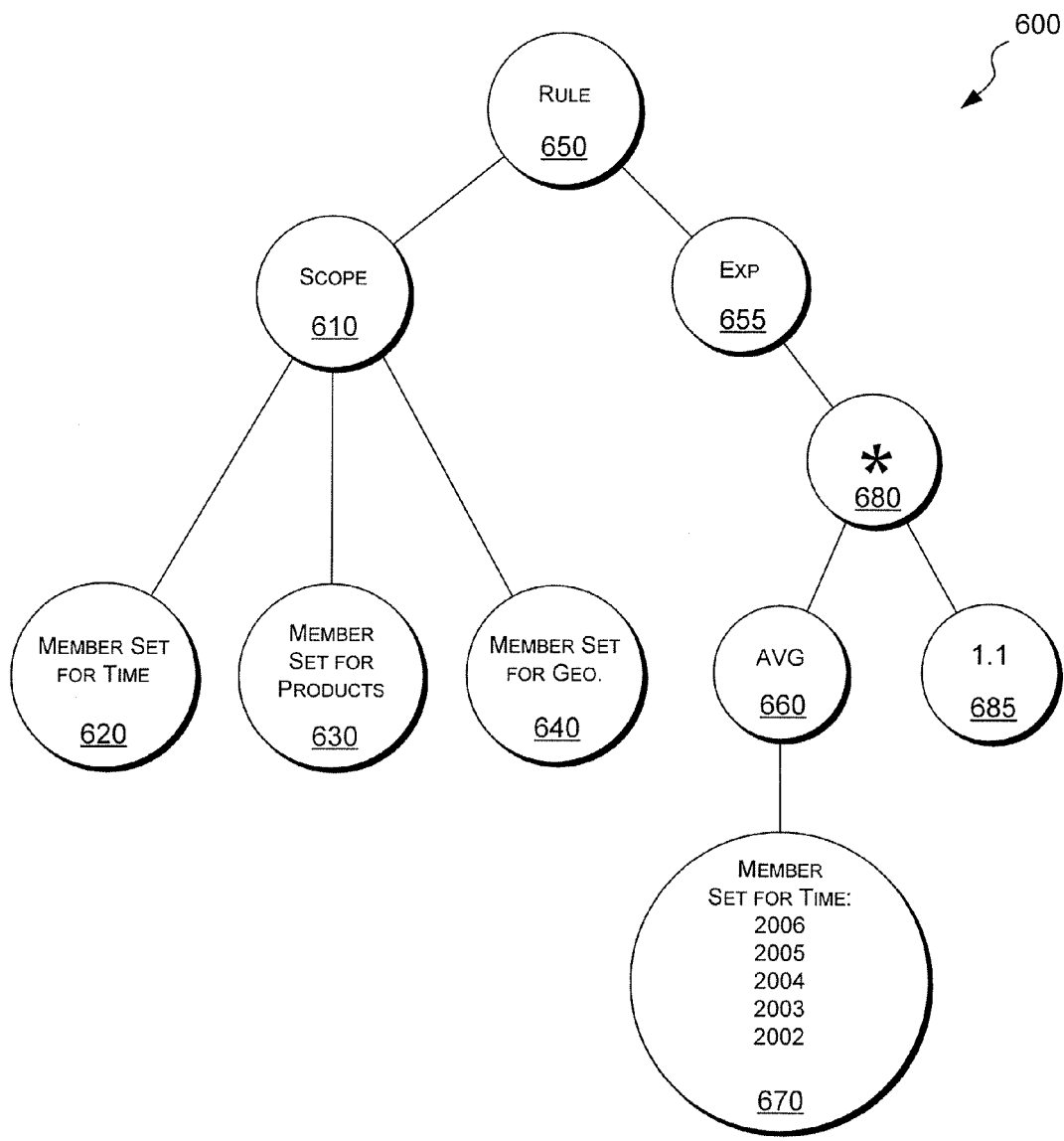
FIG. 5 is a diagram of a business rule presented in a symbolic format.
FIG. 6 is a tree diagram of the objects indicated in the business rule of FIG. 5.

FIG. 5 presents the same rule definition 600, allowing the rule definition to be compared with a symbolic form of the business rule definition presented in FIG. 6, as is further described below.

In FIG. 5 in the rule definition 500, as well as in the foregoing Eq. (2), the "Scope" statement 510 illustrates that the business rule is applicable to the year "2007" 520, and includes all members in the dimension "Product.Members" 530 and all members of the "Geographical.Members" 540. The Product.Members 530 and the Geographical.Members 540 refer to the products and locations, respectively, previously referenced in FIGS. 1-4. In this implementation, specification of a dimension, such as Product.Members 530, without further limitation, indicates that the whole dimension is within the scope of the rule.

The rule definition 500 also includes a "This" statement 550 that specifies the rule. The "This" or rule statement 550 includes an aggregation statement, "AVG" 560, which invokes the generalized function to be applied to the specified data. The specified data includes the range of years 570 that individually names the years 2006 through 2002. The rule statement 550 thus specifies a concrete list of individual members to be included. Finally, an operation 580, which is the multiplier of "*1.1" to forecast that 2007 sales will be 110% of the average sales for the previous five years, is appended, completing the statement of the rule. The "End Scope" statement 590 marks the end of the business rule.

In one implementation as illustrated in FIG. 6, the rule definition 500 (FIG. 5) is translated into an object-oriented form corresponding with the data to which the business rule applies, and the specification of the rule itself. FIG. 6 presents a tree-type diagram 600 of the business rule. The diagram 600 includes a Rule node 650 that incorporates a "Scope" node 610 and an "Expression" node 655. The Scope node 610 translates from the Scope statement 610 in the rule definition, and identifies the data to which the business rule will apply. In other words, as mentioned with reference to FIG. 6, the Scope statement 610 identifies the data that will be retrieved from the database into a business rule table to apply the business rule. The Scope node 610 identifies the time member set 620. The Scope node 610 also references the full product member set 630 and the full geographical member set 640. Because the business rule definition 600 did not limit these dimensions to specific product or geographical members, all of the members in that set or dimension are taken as part of the list.

The Rule node 650 not only references the objects needed to apply the business rule via the Scope node 610, but also references an Expression node 655. The Expression node 655 references a multiplication operation node 685, which in turn references the aggregation function AVG 660 and the multiplier 1.1 685 which applies the 110% forecast to the averaged data. In turn, the aggregation function AVG 660 references the enumerated members within the time member set 670 specified in the rule statement 500 (FIG. 5).

Thus, the Scope node 610 literally identifies what data or databases will be included in the business rule. Thus, for example, if a fact table or assumptions model were referenced, apart from the database in which the product information is stored, this would be identified in the rule definition 500 (FIG. 5) and here under the Scope node 610. Under the Expression node 655, what members will be included in the application of the business rule are specified, along with the calculations that will be performed on the specified data.

The translation of the rule 500 (FIG. 5) to its object-oriented form 600 (FIG. 6) is significant for at least three reasons. First, instead of applying operations to a potentially large, multi-dimensional database, the objects of the rule are identified to yield a more manageable operation. Second, as will be described with reference to the next example described in FIGS. 7-13, this translation also provides for adjustment of units in a leveled hierarchy, such as in a time dimension in which data may be expressed, for example, in years, quarters and months, to facilitate application of the business rule. Third, the object-oriented form facilitates application of a business rule stated in terms of relative members, for example, in terms of parents and children of other specified members.

Example of SQL Generation of a Business Rule

An exemplary process for SQL generation of a business rules is described with reference to FIGS. 7-13. The exemplary business rule is given by Eq. (3);

([Time].[Month].[September 2005],[Scenario].[All
   Members].[Budget])

=AVG([Time].[Monthly].CurrentMember.Parent.Pre-
   vMember.Children,

[Scenario].[All Members].[Actual])*(Model(Assump-
   tions));                                                        (3)

The business rule described by Eq. (3) has three dimensions: Time, Scenario, and Product. The Time dimension further includes a three-leveled hierarchy, including levels for Year, Quarter, and Month. In representing the SQL generation of the business rule given by Eq. (3), identifiers are assigned to represent dimension positions. For example, the Budget values are calculated from Actual values. The Actual and Budget values represent two different scenarios that will be represented in the intermediary tables used in applying the business rule. Specifically, in the following example, a "1" is assigned as the Scenario ID to represent Actual values, and a "2" is assigned as the Scenario ID to represent Budget values. These identifiers are symbolic in nature, and thus can be assigned arbitrarily.

The following example illustrates, starting with a given business rule, the creation of one or more intermediary tables, generation of queries or subqueries to retrieve relevant data into the business rule table, and the application of the business rule. Generally, the example concerns a rule where a budget for a month is determined as an extrapolation based on an average of historical data, which is comparable to the example described with reference to FIGS. 7 and 8.

The following example, which refers to FIGS. 7-13, also illustrates how an implementation of SQL generation of business rules adjusts for different granularities in the data. In this example, there are three database dimensions. The first dimension is Time, which has a "leveled" dimension in which each year includes four quarters and each quarter includes three months. The second dimension is Product, which represents a hypothetical product sold by a business. The third dimension is Scenario, which includes both actual financial data and budgeted or forecast data scenarios. In the following example, a scenario identification number of "1" is used to represent an actual cost figure, while a scenario identification number of "2" is used to represent a budget figure. Because there are three separate dimensions, a database representing each of these dimensions would be multidimensional in nature and, thus, would implicate the concerns with performing operations using MDX query or MDX script operations as previously described.

The defined business rule submitted by a user for analysis, using a definition format related to the objects related to the formula as used in Eq. (2) and FIG. 7, is given by Eq. (3):

([Time].[Month].[September 2005],[Scenario].[All Members].[Budget])

=AVG([Time].[Month].CurrentMember.Parent.PrevMember.Children,

[Scenerio].[All Members].[Actual])*(Model(Assumptions)); (3)

Eq. (3) is a query to determine the result for a specified scenario. The specified scenario is the budgeted value for September 2005. The answer to this query is determined by the right-hand side of Eq. (3). Specifically, the result will be derived from the average of the actual values—the specified scenario of Eq. (3)—for the children of the previous member of the parent of the current member. The current member is September 2005. Its parent is the third quarter of 2005. The previous member to the third quarter of 2005 is the second quarter of 2005. The children of the second quarter of 2005 include April 2005, May 2005, and June 2005. The average will then be multiplied by a factor from an assumptions table, as is further explained below. As will be understood by those familiar with manipulation of multidimensional databases, manipulating the data to access the actual values for the specified time period alone is a complicated operation. FIGS. 7-13 and the corresponding descriptions below describe how an implementation of the present disclosure performs SQL generation of business rules to apply the business rule specified in Eq. (3).

FIG. 7 shows a portion of a time dimension table 700 used in an implementation of SQL generation of rows to address time hierarchy issues. The table 700 includes the period of time at issue in Eq. (3). The time dimension table 700 includes three columns corresponding to three time hierarchy levels: a year column 710, a quarter column 720, and a month column 730. In the year column 710, each year is represented by four digits. For example, the year 2005 is represented in the year column 710 with a conventional, four-digit designation 2005 712. In the quarter column 720, the year and the quarter are represented by a five-digit figure in which the first four digits represent the year and a trailing fifth digit to represent the quarter. For example, the third quarter of 2005 is represented in the quarter column 722 as 20053 722. In the month column 730, the year and month are represented by a six-digit number in which the first four digits again represent the year and the last two digits represent the month. For example, September 2005 is represented in the month column 730 as 200509 732, and June 2005 is represented in the month column 730 as 200506 734. Implementations of SQL generation of business rules also could address other time level hierarchies, including half-years, groups of years, etc. The time dimension table 700 is designated as "dimtime" 790 to support referencing by queries or subqueries.

FIG. 8 shows a portion of an original fact table 800 in which some of the original data is stored that will be used as source data in the present example of deriving an answer to the business rule expressed by Eq. (3). The fact table 800 includes, in addition to a set of line numbers 810 typically found in computer-generated tables, five columns: a row identifier (RowID) column 820, a month identifier (MonthID) column 830, a scenario identifier (ScenarioID) column 840, a product identifier (ProductID) column 850, and a Value column 860. The RowID column 820 includes a sequential series of numbers 822 associated with each row of data. The MonthID column 830 lists each of the months for which data is presented in the fact table 800 in the six-digit format described with reference to FIG. 7, such as 200509 832 representing September 2005.

The ScenarioID column 840 identifies the scenario for which data is presented in the Value column 860. Because the table 800 includes a portion of the original fact table, the data in the Value column 860 includes actual data. Thus, the scenario identifiers listed in the ScenarioID column 840 each includes a 1 842 signifying actual data. The ProductID column 850 in the fact table 800 specifies a product identifier, such as ProductID 230 852 for which data is provided each of the months listed in the MonthID column 830. Finally, the Value column 860 lists a substantive data value for each of the month identifiers listed in the month column 830, such as 700 862. For referencing by other queries, the original fact table is designated as facttable 890.

FIG. 9 shows a portion of an original assumptions table 900 storing assumptions used in of deriving an answer to the business rule expressed by Eq. (3). The assumptions table 900 includes, in addition to a set of line numbers 910 typically found in computer-generated tables, five columns: a row identifier (RowID) column 920, a year identifier (YearID) column 930, a product identifier (ProductID) column 940, and a Value column 950. The RowID column 920, like the RowID column 810 of FIG. 8, includes a sequential series of numbers 922 associated with each row in the table 900. The YearID column 930 lists each of the years presented in the assumptions table 900, such as 2006 932. The ProductID column 940 in the assumptions table 900 specifies a product identifier, such as ProductID 230 942 for which a value is provided in the assumptions table 900. Finally, the Value column 950 lists an assumption value for each of the rows, such as 1.4 952. For referencing by other queries, the original assumptions table is designated as a table 990

In an implementation of the present disclosure, one or more intermediary tables are created to receive data to be retrieved from a multidimensional data structure using an SQL query to further the application of the business rule. FIG. 10 represents a first intermediary table 1000 used in applying the business rule of Eq. (3).

Creating and populating the first intermediary table is accomplished by generating and executing an SQL query or subquery. A subquery includes a query configured to retrieve part of the specified data involved in applying the business rule and/or applying a portion of the functions to be applied to the specified data. In the example of the first intermediary table 1000, such a query is given by Eq. (4):

selecting 200509 as MonthID,2 as ScenarioId,ProductId as ProductId,

MonthId as S_monthId,ScenarioId as s_ScenarioId, value from facttable where exist(select*from dim_time $t1$ where $t1$.Month=facttable MonthId and $t1$.Quarter=(select max($t2$.quarter) from dim_time $t2$ where $t2$.quarter<(select $t3$.quarter from dim_time $t3$ where $t3$.Month=200509))) (4)

The query of Eq. (4) is a relative simply query to process and, as will be appreciated, much simpler to apply and run than a query that sought to apply the business rule directly to the multidimensional data structure from which the data will be extracted by the query of Eq. (4). To facilitate referencing the first intermediary table 1000 in subsequent queries, the first intermediary table is designated as temptable1 1090.

The first intermediary table 1000 is used to gather appropriate data from the fact table for the time period of interest in Eq. (3). As previously described, Eq. (3) seeks an answer for September 2005 or 200509. As also previously described, the value to be calculated is based on the children of the previous member to the parent of the current period, which would be the months of April 2005, May 2005, and June 2005, for which the month identifiers would be 200504, 200505, and 200506, as previously described. As shown in FIG. 10, in a MonthID column 1010, three rows 1012 each labeled with month identifier 200509 1014, are generated to receive data for each of the months from data used in the application of the rule will be drawn. In each of the rows, the month identifier 1014 refers to a budget value or scenario to be determined. Thus, in a ScenarioID column 1020, a scenario identifier of 2 1022 is stored.

As can be seen from the original fact table, only one ProductID, 220, is associated with each of the source months. Thus, in a ProductID column 1030, a product identifier 220 is stored in each row of the column. Because the business rule specified in Eq. (3) identified that all members would be included in the calculation, if the fact table 800 (FIG. 8) included separate rows to present values for different ProductIDs for each of the MonthIDs listed, then rows would be generated in the intermediary table 1000 for each MonthID and for each ProductID associated with each MonthID.

A source month identifier (S_MonthID) column 1040 is created in which the month identifiers for the source months specified by the business rule of Eq. (3) are listed. Because the values for each of the months represented in the S_MonthID column 1040 are actual data, a source scenario identifier (S_ScenarioID) column 1050 lists a 1 1052 for each of the entries, indicating that the values presented are actual values. A Value column 1060 presents the actual values associated with each of the source months represented in the intermediary table, such as the value 400 1062 presented for S_MonthID 200506 1042

The first intermediary table 1000 presents enumerated values to be used in calculating the result of the business rule of Eq. (3). As previously described, the rule is based on data for the values for all of the members for the months of 200504, 200505, and 200506, which were identified using the time dimension table 700 (FIG. 7). With the identification of the specific months for which the business rule of Eq. (3) is calculated, the first intermediary table 1000 is used as a repository into which the relevant values can be retrieved and stored.

FIG. 11 shows a second intermediary table 1100 illustrating the application of the aggregation function specified in the business rule of Eq. (3) on the data included in the first intermediary table 1000 (FIG. 10). Again, an object of implementations of the present disclosure is the simplification of determining results of business rules by using SQL queries to extract data relevant to the business rule from a multidimensional database and then calculating the results in the intermediary tables, which is much more efficient. This efficiency is shown in FIG. 12 in which the second intermediary table 1200 is populated by running a query on the manageable set of data already retrieved into the first intermediary table 1000.

The second intermediary table 1100 includes six columns: a MonthID column 1110, a ScenarioID column 1120, a ProductID column 1130, two value columns including v1 column 1140 and v2 column 1150, and a Value column 1160. The v1 column 1140 and the v2 column 1150 represent values to be retrieved and/or derived from the first intermediary table 1000 and/or other tables. As further described below, the v1 column 1140 will include data derived from the first intermediary table 1000 (FIG. 10), while the v2 column 1150 will include data derived from the assumptions table 900 (FIG. 9). The value column 1160 will include the final result of the application of the business rule given by Eq. (3). The second intermediary table 1100 has six columns but only one row, because the aggregation function reduces values for a number of source points to a single average, multiplied by a selected value.

As a first part of this calculation, the second intermediary table 1100 results from a query run on the first intermediary table 1000 (FIG. 10) given by Eq. (5):

select MonthId,ScenarioId,ProductId,avg(value)

from temptable1 group by monthId,scenarioID,productId (5)

As shown by the query of Eq. (5), the aggregation function of taking the average (avg) of the values stored in the first intermediary table 1000 is incorporated within the query. The result of the aggregation function is 300, stored in the v1 column 1140 of the second intermediary table 1100. The value 300 1142 stored in the v1 column 1140 is the average of the three values stored in the Value Column 1060 of FIG. 10, as specified by the query of Eq. (5). In the v2 column 1150 and the Value column 1160, NULL values 1152 and 1162 are stored because the determination of the data for columns 1150 and 1160 is not complete. To facilitate referencing the second intermediary table 1100 in subsequent queries, the second intermediary table is designated as temptable2 1190.

As a second part of the calculation, data is retrieved from the assumptions table 900 by another query given by Eq. (6):

update temptable2 set v2=atable.value from table where atable.YearId=(select Year from dim_time
where Month=200509) and
atable.productId=temptable2.productId (6)

The result of this query, the assumption table value, is then written to an updated second intermediary table 1200 shown in FIG. 12. The update includes the assumptions table value stored in the v2 column 1250 and the calculation of the result stored in value column 1260. The value retrieved from the assumptions table is 1.4 1252 and the result 420 1262 (1.4 multiplied by the result of the aggregation function 300 1142 previously calculated).

It should be noted that the value from the assumptions table 900 is associated with a different time hierarchy level; the assumptions table 900 stores data for each of the ProductIDs by year, not in months, the units of the second intermediary table 1200. However, according to implementations of the present disclosure, the appropriate value can be found by adjusting the time dimension and matching the ProductID to retrieve the appropriate value to be entered in the second intermediary table 1200.

If desired, the result derived can be written to update the original fact table. The SQL statement for updating the fact table is provided by Eq. (7):

insert into facttable select MonthId,scenarioId,productId,value from temptable2 (2)

This statement results in, as shown in FIG. 13 an updated fact table 1300. The updated fact table 1300 is identical to the fact table 800 of FIG. 8 with the exception of the addition of the new values appended in a new row 1310. The new row specifies for the MonthID 200509 1312, which was the object of this process, has a value 1314 of 420. Because the value 1314 is a budgeted value, not an actual value, the ScenarioID column for the new row 1310 is 2 1316.

In sum, FIGS. 7-13 illustrate how, instead of a complicated multi-dimensional calculation, the business rule of Eq. (3) can be applied using one more intermediary tables into which data is retrieved and processed using SQL queries and functions.

Process of SQL Generation of a Business Rule

Figure 14A:
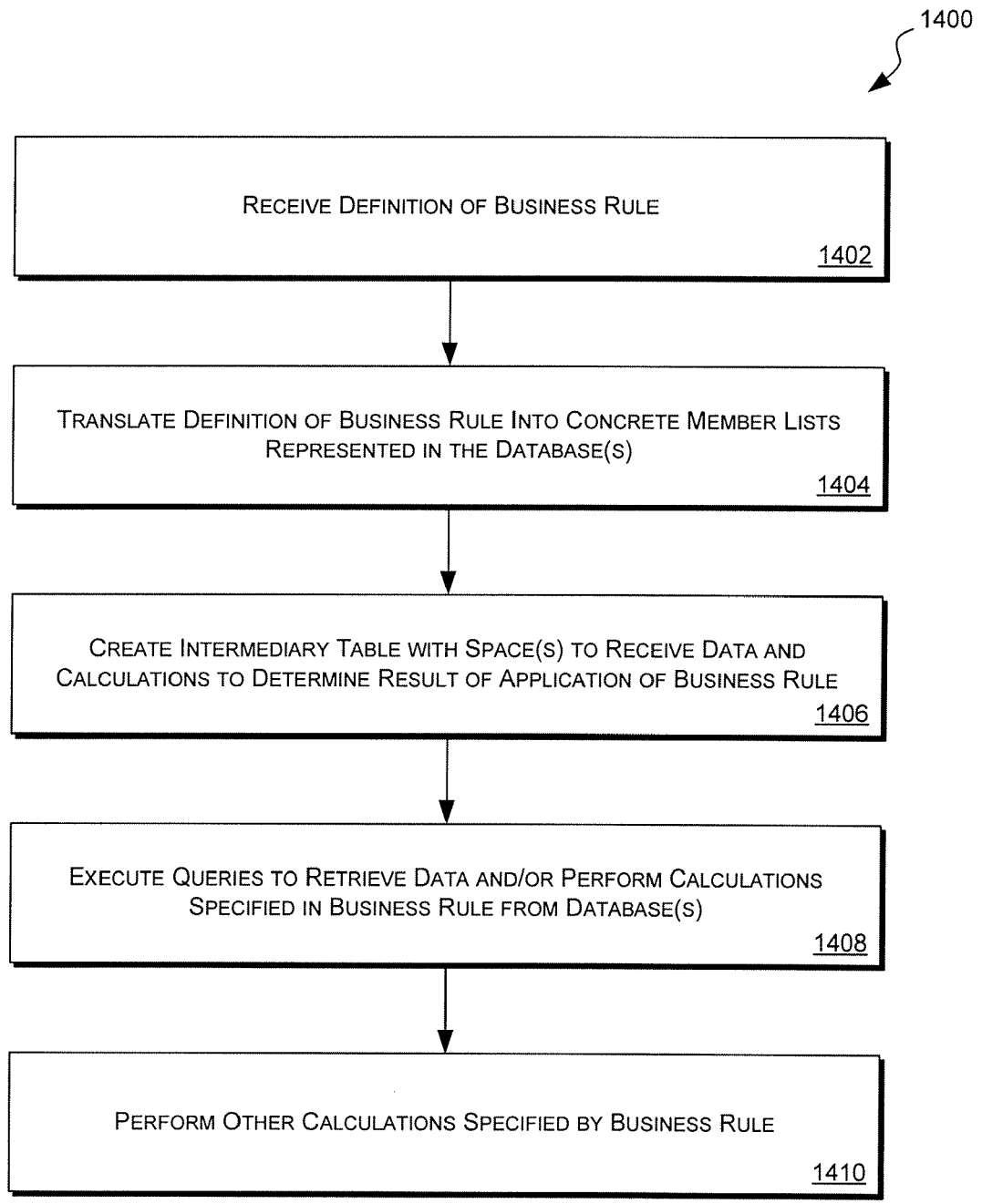
FIGS. 14A and 14B are flow diagrams illustrating possible implementations for processes for generation of business rules.

FIG. 14A presents a flow diagram 1400 illustrating a generalized implementation of SQL generation of business rules. At 1402, a definition of a business rule is received. At 1404, the definition of the business rule is translated into concrete member lists represented in the database. As is described below, it is desirable to receive the definition at 1402 in a form that maps to the objects in the database to facilitate the generation of the member lists to facilitate application of the business rule.

At 1406, an intermediary table is created to receive the data relevant to the business rule and/or to perform the calculations on that data to apply the business rule. As described with reference to the example of FIGS. 7-13, data space is included in the intermediary for the data values to be used in deriving results for each of the members specified in the business rule, and calculation spaces are included to store the results of calculations to be performed on the data. In one implementation, the business rule table is a temporary table created using a relational database manager. At 1408, queries are executed to retrieve from one or more databases the data specified in the business rule. At 1410, other calculations relevant to the business rule are computed.

Figure 14B:
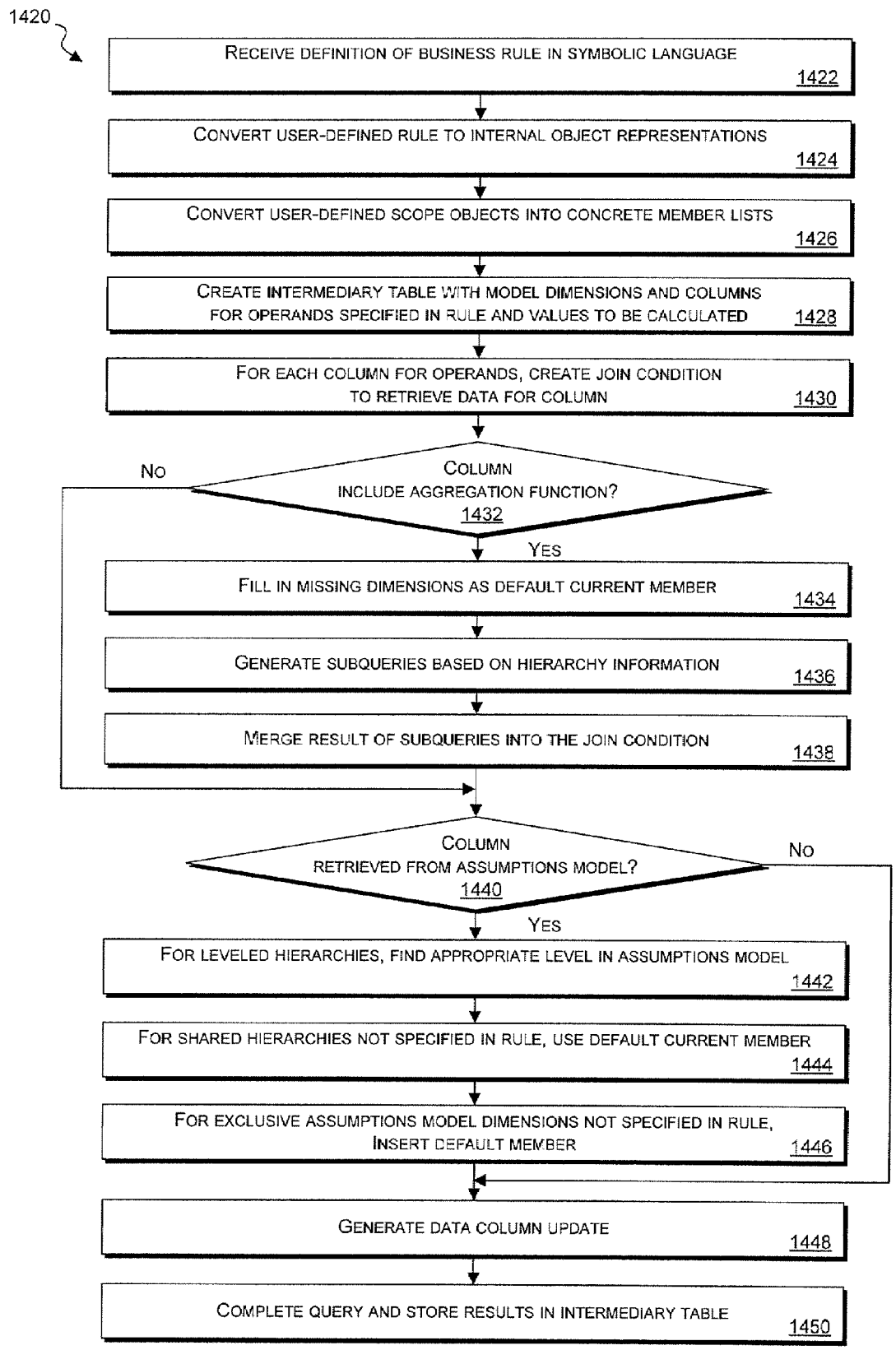

FIG. 14B presents a flow diagram 1420 of a more detailed implementation of SQL generation of business rules. At 1422, a definition of a business rule is received. At 1424, a user-defined rule is converted to appropriate internal object representations. Again, the user-defined rule may be specified in a symbolic form or language that correlates with, but is not the same as, the internal object representations. Converting the user-defined rule to the internal object representations facilitates the application of the business rule as previously described. 1426, user-defined scope objects are converted into concrete member lists, such as described with reference to FIGS. 5 and 6.

At 1428, an intermediary table is created using the model dimensions and having columns for operands specified in the rule and four values to be calculated. As described with reference to the example of FIGS. 7-13, creation of this table with locations for operands to be retrieved from the database provides a platform on which the business rule can be applied. Similarly, leaving columns for the values to be calculated also facilitates the calculations appropriate to applying the business rule. As also described with reference to the example of FIGS. 7-13, more than one intermediary table may be created, as exemplified in the two intermediary tables presented in FIGS. 10 and 11. At 1430, for each column created for operands, a joint condition is created to retrieve data for that column.

At 1432, it is determined if the column includes an aggregation function. If so, at 1434, missing dimensions, which includes data values for which locations are provided in the database but store no data, are filled in with a default current member value. At 1436, one or more subqueries, based on the hierarchy information, are generated to retrieve appropriate operands or other data from the database. Again referring to the example of FIGS. 7-13, implementations of rule generation provide for adjusting to data being specified in terms of hierarchical relationships such as the parent/child/previous member relationships described with reference to the foregoing example. At 1438, the results of the subquery or subqueries are merged into the join condition created at 1430. Referring back to 1432, if it is determined at 1432 the column does not include an aggregation function, the flow diagram 1420 advances to 1440.

At 1440, it is determined if the column involves retrieval from assumptions model or table. If so, at 1442, for level to hierarchies, an appropriate level is found in the assumptions model. For illustration, with reference to the foregoing example, the business rule sought a result for a specified month, while the assumptions table enumerated assumptions values in terms of years. In identifying the year with which the month was associated, by using the Time dimension table, the apparent gap between the operands and the assumptions table could be bridged. At 1444, for shared hierarchies and not specified in the rule, a current default member is used. At

1446, for exclusive assumptions model dimensions not specified in the rule, a default member can be inserted as a placeholder.

At 1448, a data column update is generated by performing calculations on available data values according to the specified business rule. At 1450, the query is completed with the results being stored in the intermediary table, such as shown in FIG. 12.

In addition to processes shown in FIG. 14B, possible implementations of rule generation could also employ data validation on the data collected in the intermediary table. Furthermore, if desired, the result of results derived using the intermediary table may be stored and updated fact table as described with reference to FIG. 13.

Operating Environments for SQL Generation of a Business Rule

Figure 15:
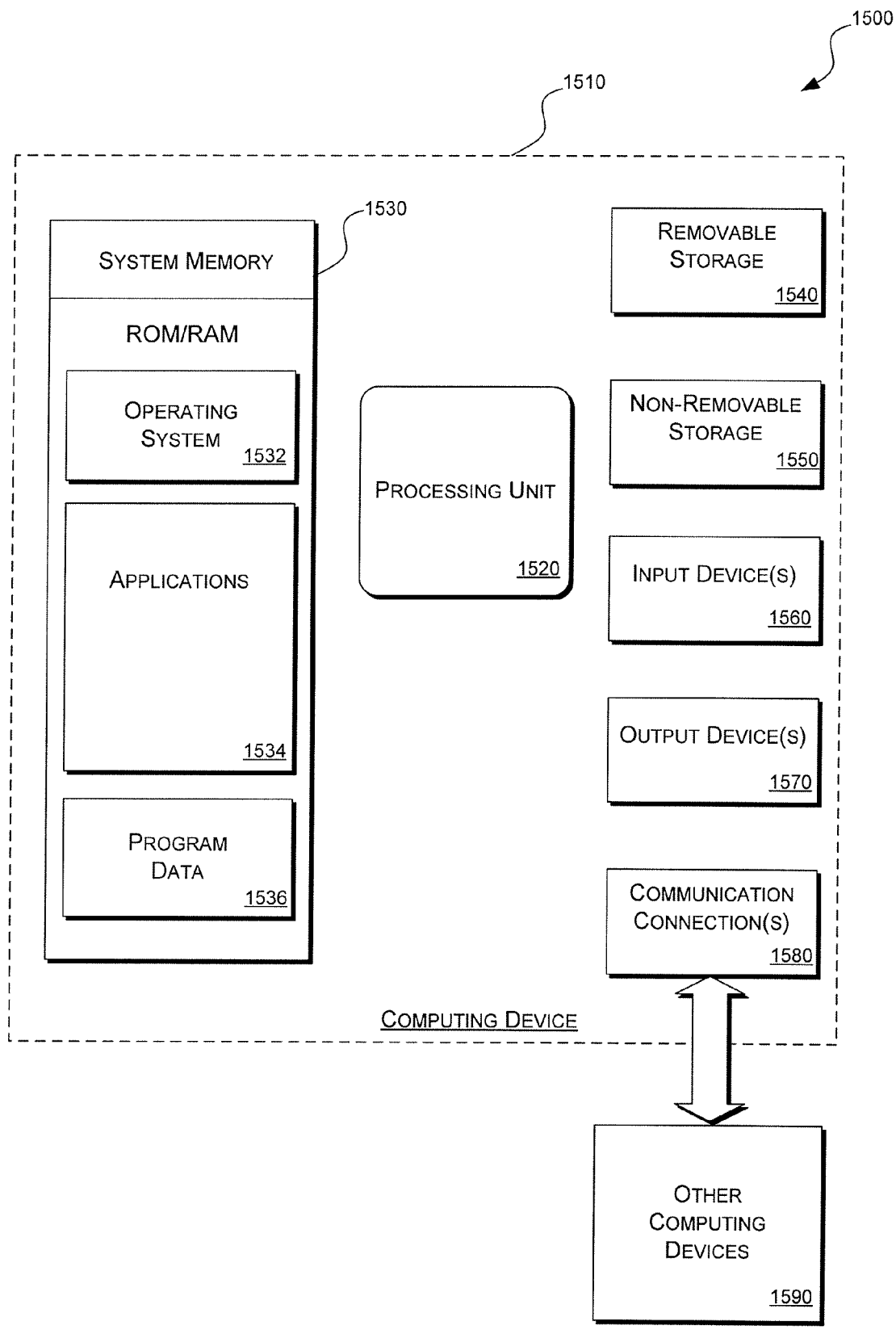
FIG. 15 is block diagram of an operating environment operable to support execution of computer-implemented methods and operate using computer-readable storage media as herein described.

Implementations of generating SQL business rules may be supported by a number of different standalone and networked computing environments. FIG. 15 is a block diagram of a representative operating environment 1500.

Referring to FIG. 15, an exemplary operating environment 1500 includes a computing device, such as computing device 1510. In a basic configuration, the computing device 1510 may include a stationary computing device or a mobile computing device. The computing device 1510 typically includes at least one processing unit 1520 and a system memory 1530. Depending on the exact configuration and type of the computing device 1510, the system memory 1530 may be volatile (such as RAM), non-volatile (such as ROM, flash memory, and the like) or some combination of the two. The system memory 1530 typically includes an operating system 1532, one or more applications 1534, and may include program data 1536.

The computing device 1510 may also have additional features or functionality. For example, the computing device 1510 may also include additional data storage devices (removable and/or non-removable) such as, for example, magnetic disks, optical disks, or tape. Such additional storage is illustrated in FIG. 15 by removable storage 1540 and non-removable storage 1550. Computer storage media may include volatile and non-volatile, removable and non-removable media implemented in any method or technology for storage of information, such as computer readable instructions, data structures, program modules or other data. The system memory 1530, the removable storage 1540, and the non-removable storage 1550 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 1510. Any such computer storage media may be part of the computing device 1510. The computing device 1510 may also include one or more input devices 1560 such as a keyboard, mouse, pen, voice input device, touch input device, etc. One or more output devices 1570, such as a display, speakers, printer, etc., may also be included.

The computing device 1510 also includes one or more communication connections 1580 that allow the device to communicate with other computing devices 1590, such as over a network or a wireless network. The one or more communication connections 1580 represent an example of communications media. Communications media typically embody computer readable instructions, data structures, program modules, or other data in a modulated data signal such as a carrier wave or other transport mechanism, and include any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Figure 16:
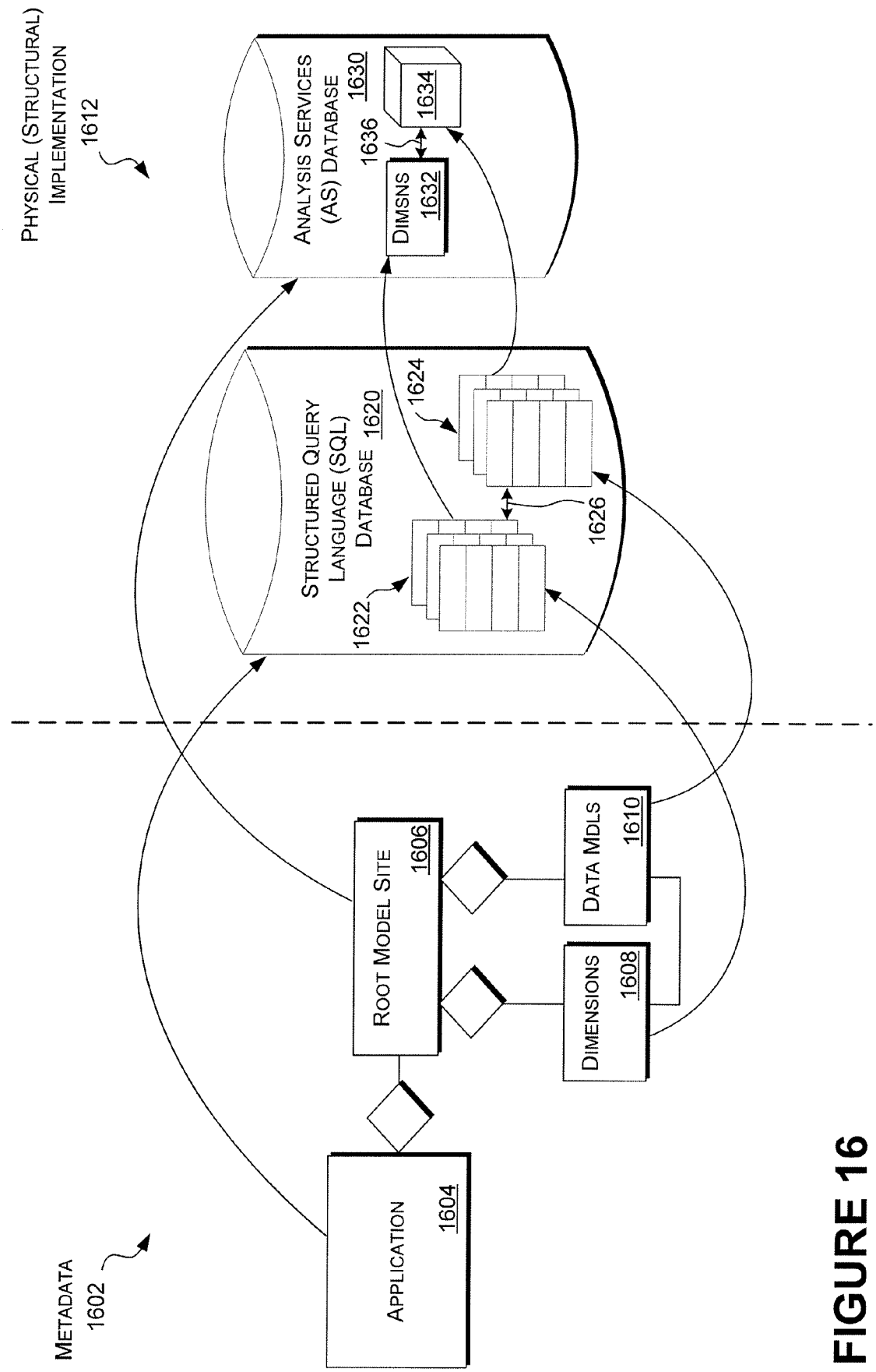
FIG. 16 is an example of an operating environment in which implementations of generation of business rules may be desirable.

FIG. 16 illustrates an operating environment 1600 adapted to take advantage of possible implementations of SQL generation of business rules. The operating environment reflects an implementation of Microsoft Office 2007 PerformancePoint Server mentioned previously. More detail on this implementation is described in commonly-assigned, concurrently pending U.S. patent application Ser. No. 11/771,425 for "METADATA-BASED APPLICATION DEPLOYMENT" filed Jun. 29, 2007.

In one implementation, such a system uses metadata 1602 to describe an application 1604. According to taxonomy of one implementation of a scalable application system, the application 1604 includes a root model site 1606 including a number of dimensions 1608 and data models 1610. According to one implementation, the taxonomy is implemented in a physical structure 1612. The physical structure includes an SQL database 1620 in which the dimensions 1608 and the data models 1610 of the root model site 1606 are represented in the relational database 1620 as a plurality of tables 1622 and 1624, respectively. Foreign key links 1626 may join the table or tables 1622 corresponding with the dimensions 1608 to the table or tables 1624 corresponding with the models 1610.

In the implementation shown, contents of the root model site 1606 are stored in a multidimensional database 1630. The multidimensional database 1630, in one implementation, is an Analysis Services (AS) database, such as can be managed by Analysis Services offered by Microsoft Corporation. In the multidimensional database 1630, the dimensions 1632 of the root model site 1606 (stored as tables 1622 in the relational database 1620) are also stored as dimensions in the multidimensional database 1630. The data models 1610, also stored as tables 1624 in the relational database 1620, are stored in as a multidimensional structure 1634, such as a data cube, in the multidimensional database 1630. The dimensions 1632 and the multidimensional data structure 1634 are joined by links or keys 1636 to associate the desired dimensions 1632 with appropriate entries of the multidimensional structure 1634.

The multidimensional database 1630 is used for analysis and reporting, whereas the SQL database 1620 serves as a master repository of all the application data and metadata. As previously described, however, analysis and reporting using the multidimensional database 1630 may prove inefficient. Implementations of SQL generation as previously described provide for efficient application of data rules to the multidimensional database by using the queries and intermediary tables as previously described.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method, comprising:
receiving a rule defining one or more calculations to be performed on specified data stored in a multidimensional database to yield at least one result; wherein the rule comprises a scope definition that describes: the dimension when the rule applies to a whole dimension of the multidimensional database; members within a dimension when the rule does not apply to the whole dimension; and an expressions definition that defines operations to perform on the specified data;
converting the rule to an object-oriented form that comprises a scope node and an expressions node at a first hierarchical level; wherein the scope node comprises child elements identifying the data to retrieve from the multidimensional database; wherein the expressions node comprises child elements identifying operations to perform;
generating a relational database query seeking the specified data relevant to the rule to be retrieved from the multidimensional database;
creating an intermediary table to accommodate the specified data retrieved from the multidimensional database;
storing the specified data in the intermediary table; and
manipulating the specified data in the intermediary table as specified by the rule to determine the at least one result.

2. The computer-implemented method of claim 1, wherein the object oriented form comprises a rules node that is a parent node to the scope node and the expressions node.

3. The computer-implemented method of claim 1, further comprising, when the rule identified the specified data in a symbolic form indirectly identifying a group of members, converting the symbolic form into a member list identifying the group of members.

4. The computer-implemented method of claim 1, wherein creating the intermediary table includes:
creating a data space configured to store one or more values in the selected data; and
creating a calculation space configured to store a result of one or more calculations to be performed using the one or more values in the selected data.

5. The computer-implemented method of claim 4, wherein the data space and the calculation space each are presented as additional columns in the intermediary table.

6. The computer-implemented method of claim 1, further comprising, for each of the values stored in the data spaces, generating and executing queries to facilitate the retrieving of the data from the database.

7. The computer-implemented method of claim 6, further comprising performing any additional calculations indicated in the business rule to determine the at least one result.

8. A computer-implemented method, comprising:
receiving a business rule defining one or more calculations to be performed on specified data stored in a database to yield at least one result;
converting the business rule to an object-oriented form that comprises a scope node and an expressions node at a first hierarchical level; wherein the scope node comprises child elements identifying the data to retrieve from the database; wherein the expressions node comprises child elements identifying the one or more calculations to perform;
creating at least one intermediary table to accommodate the specified data;
generating a plurality of queries for one or more of:
retrieving the specified data from the database; and
manipulating the specified data by performing a function on the specified data retrieved from the database;
storing the specified data in the intermediary table;
performing the one or more calculations on the specified data stored in the intermediary table.

9. The computer-implemented method of claim 8, wherein the object oriented form comprises a rules node that is a parent node to the scope node and the expressions node.

10. The computer-implemented method of claim 8, further comprising, when the request recites the specified data in a symbolic form, converting the symbolic form into a concrete member list including each item in the specified data.

11. The computer-implemented method of claim 8, wherein creating the intermediary table includes for each dimension in the specified data includes:
creating a data space configured to store values of the specified data; and
creating a calculation space configured to store at least one of a formula and a formula result based on the one or more calculations to be applied to the values.

12. The computer-implemented method of claim 11, wherein the data space and the calculation space each are presented as additional columns in the calculation space.

13. The computer-implemented method of claim 8, further comprising for each of the values stored in the data space:
creating a join condition to facilitate the retrieving of the specified data from the database; and
generating queries to facilitate the retrieving of the data from the database.

14. The computer-implemented method of claim 13, further comprising, when the data column includes entries resulting from an aggregation function:
for any missing dimensions not included in the database, filling in a current member as a default;
building a plurality of subqueries using hierarchy information about the entries in the data column; and
merging results of the plurality of subqueries into the join condition to facilitate the retrieving of the specified data from the database.

15. The computer-implemented method of claim 13, further comprising, when the data column includes entries derived from an assumptions model, one of:
for one or more leveled hierarchies, adjusting a granularity of the entries in the assumptions model to a specified granularity specified by the request;
for one or more shared hierarchies not included in the rule, adding a current member as a default; and
for model dimensions not specified in the rule, inserting a default value.

16. The computer-implemented method of claim 8, upon the retrieving of the data from the database, further comprising validating the data.

17. The computer-implemented method of claim 8, further comprising updating a fact table with a result of the one or more calculations on the specified data stored in the calculation space.

18. A computer-readable storage media maintaining a plurality of stored computer-executable instructions, the stored instructions comprising instructions for:
receiving a business rule defining one or more calculations to be performed on specified data stored in a database to yield at least one result;
converting the business rule to an object-oriented form that comprises a scope node and an expressions node at a first hierarchical level; wherein the scope node comprises child elements identifying the data to retrieve from the database; wherein the expressions node comprises child elements identifying the one or more calculations to perform;

creating at least one intermediary table to accommodate the specified data;

generating a plurality of queries for one or more of:
  retrieving the specified data from the database; and
  manipulating the specified data by performing a function on the specified data retrieved from the database;

storing the specified data in the intermediary table; and determining the result of the business rule.

19. The computer-readable storage medium of claim 18, wherein the object oriented form comprises a rules node that is a parent node to the scope node and the expressions node.

20. The computer-readable storage medium of claim 18, wherein the instructions for creating the intermediary table include for each dimension in the specified data instructions for:

creating a data space configured to store values of the specified data; and creating a calculation space configured to store at least one of a formula and a formula result based on the one or more calculations to be applied to the values.

* * * * *